United States Patent [19]

Moll et al.

[11] Patent Number: 4,879,955
[45] Date of Patent: Nov. 14, 1989

[54] OFFICE WORKSTATION

[75] Inventors: Reiner Moll, Schwaeb.Gmuend-Lindach; Andreas Utz, Spraitbach, both of Fed. Rep. of Germany

[73] Assignee: Planmoebel Eggersman GmbH & Co. KG, Espelkamp, Fed. Rep. of Germany

[21] Appl. No.: 210,507

[22] Filed: Jun. 23, 1988

[30] Foreign Application Priority Data

Jun. 23, 1987 [DE] Fed. Rep. of Germany ....... 3720639

[51] Int. Cl.<sup>4</sup> ............................................. A47B 17/00
[52] U.S. Cl. ...................................... 108/50; 312/195
[58] Field of Search ................... 108/50, 64, 153, 111, 108/114, 60, 155; 312/195, 140

[56] References Cited

U.S. PATENT DOCUMENTS

| | | | |
|---|---|---|---|
| 3,117,535 | 1/1964 | Hendrickson | 108/64 |
| 3,511,192 | 5/1970 | Noren | 108/64 |
| 4,163,592 | 8/1979 | Nelson | 108/64 X |
| 4,639,049 | 1/1987 | Frascaroli et al. | 312/195 |
| 4,678,359 | 7/1987 | Egbert | 312/140 X |
| 4,679,510 | 7/1987 | Veyhl et al. | 108/64 |
| 4,762,072 | 8/1988 | Boundy et al. | 108/50 |

FOREIGN PATENT DOCUMENTS

| | | | |
|---|---|---|---|
| 2130877 | 6/1984 | United Kingdom | 312/195 |
| 2172197 | 9/1986 | United Kingdom | 312/195 |

*Primary Examiner*—Peter A. Aschenbrenner
*Attorney, Agent, or Firm*—Nixon & Vanderhye

[57] ABSTRACT

An office workstation with a table plate (2) which rests on a lower frame (6). At the front left or right-hand side the table plate has an oblique edge (44) against which attachments, particularly plates (50,60) can be placed. The table plate is mounted on the lower frame (6) with a height adjustment device (68). The height adjustment device engages in through-openings (28) in the table plate (2). Support arms (12, 48) of an upper frame are to be firmly connected to the lower frame through these openings, when required. The upper frame can carry additional components (75,76) such as storage shelves or a vertical wall (16). The lower frame is composed of legs (7), which can serve to guide cables, and joint bodies (18,160) which are hollow and represent the connection between the legs and horizontal hollow beams (22,23,24,116). The hollow beams are accessible from the exterior through a flap (118) extending over their entire length. Two joint bodies (18), which are situated below the openings (28) in the table plate, accommodate a respective one of the height adjustment devices (68).

28 Claims, 9 Drawing Sheets

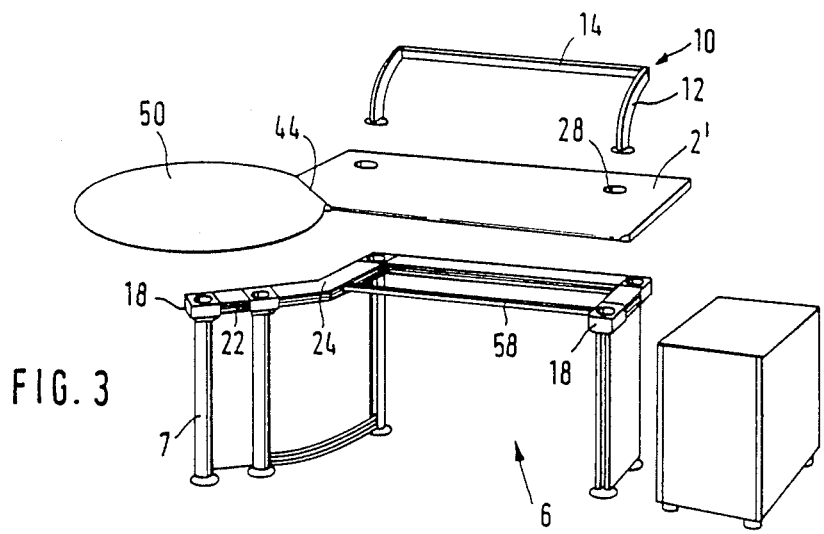
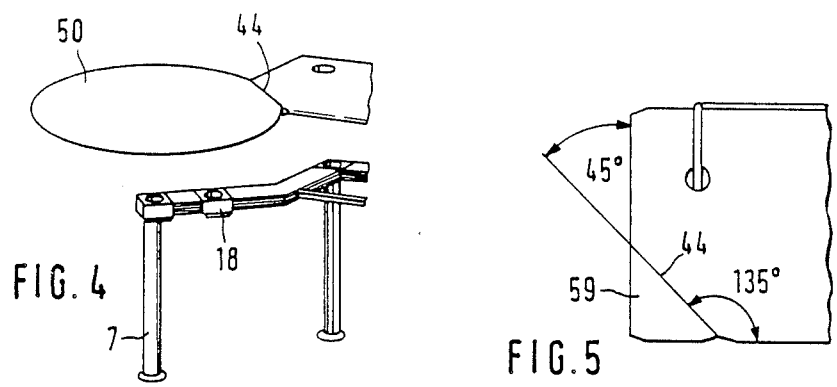
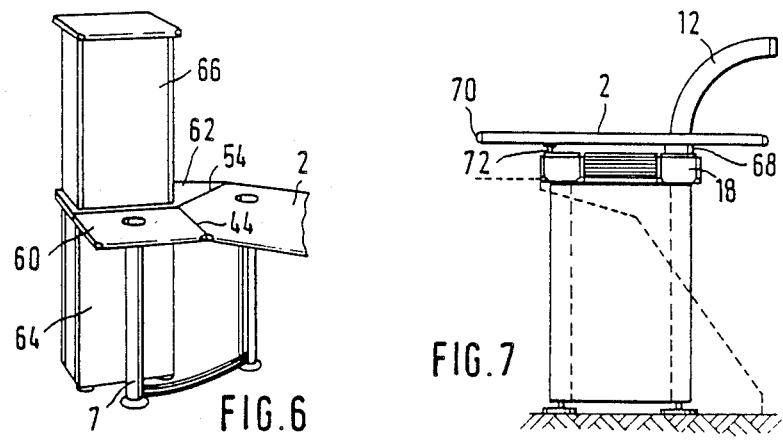

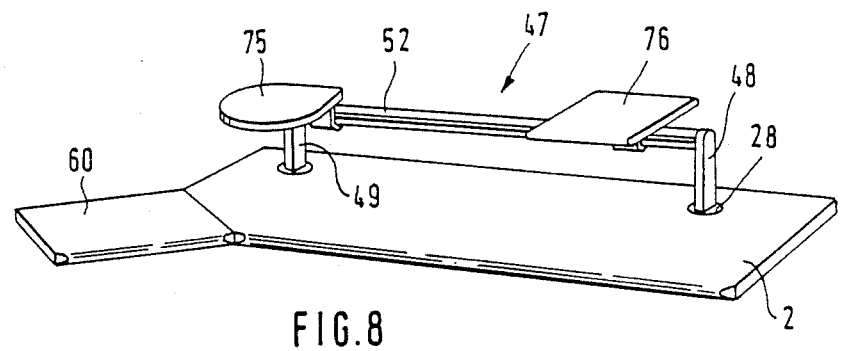
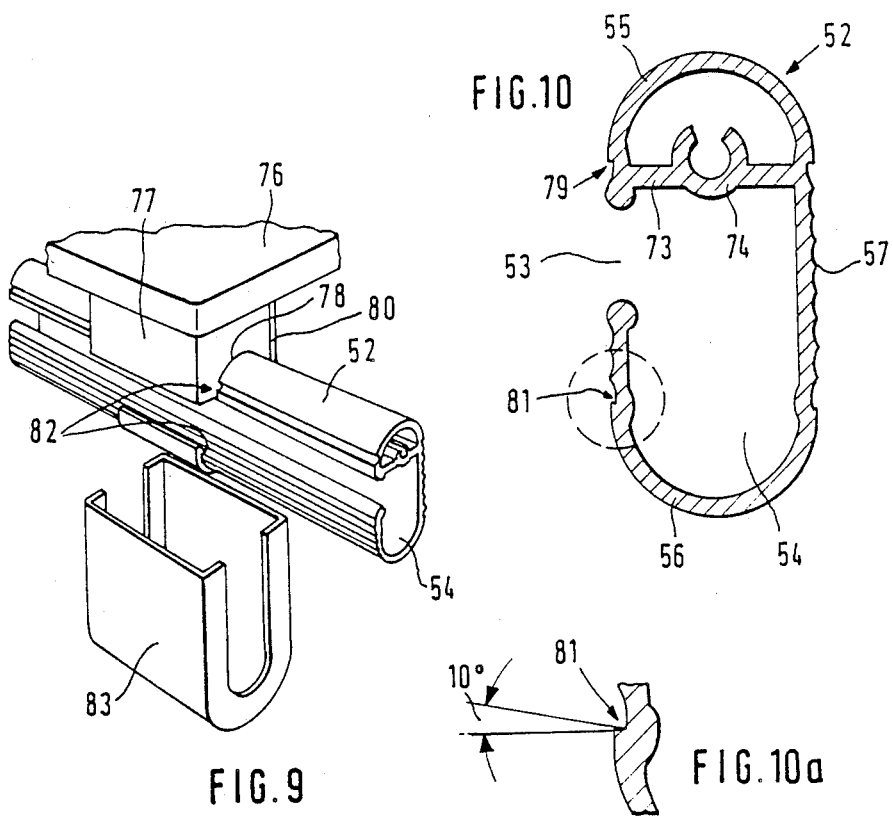

OFFICE WORKSTATION

The invention relates to an office workstation generally of the type disclosed in EP-A2-123972, but with additional features and improvements as explained below.

By virtue of this invention, an office workstation is constructed so that additional working surfaces may be added to the table top which extend not only laterally but also forwardly so that they may be easily reached by the user. The lower frame is extendable in a very simple and time-saving manner, and such that cables may be led in a very simple manner through the individual components so that the cable pathway can be rapidly altered even in the case of a reconfiguration of the workstation.

It is also desirable that the lower frame be connectable, when required, directly to an upper frame which can carry additional components such as storage shelves and the like.

Devices with a power connection standing on the table top or working surface, should be connectable to a power supply in such a manner that only very short portions of cable are situated on the table and no cable hangs downwardly over the edges of the table top.

Terms such as "front", "rear", "top", "bottom" refer in all cases to the workstation in its use position from the viewpoint of the user sitting in front of the table top.

In one exemplary embodiment, the invention comprises in its broader aspects a lower frame including a plurality of vertically oriented legs; a plurality of hollow joint bodies supported on the legs at upper ends thereof; a plurality of hollow beams connected between the hollow joint bodies; a table top vertically adjustably supported by the lower frame, the table top having at least one corner having an edge extending obliquely to an adjacent edge, and wherein one of the plurality of hollow beams extends substantially perpendicularly away from and beyond the oblique edge; an upper frame vertically adjustably supported by the lower frame and including a horizontal carrier mounted between a pair of substantially vertical supports extending through the table top; and wherein the legs, the joint bodies, the hollow beams and the upper frame include through openings for passage of cables.

The oblique edge, which has a length of at least 30 cm, commonly about 45 cm, serves for the adding on of further table top extensions or working surface extensions so that when these are at the same height a continuous working surface is provided.

The hollow joint bodies with their large openings and the associated supports and hollow beams facilitate the reconfiguration and extension of the workstation and the passing through of electrical cables.

The oblique edge can extend at an angle of about 135° to the front edge of the table top whereby a table top or working surface extension will be located in a position favourable for the user.

One of the hollow beams can be angled in a manner corresponding to the oblique edge such that its free end projects at right-angles beneath the oblique edge and can serve for carrying further additional components.

In the lower frame the hollow beams preferably form a rearward connection and lateral connections between the supports whilst the cable passages extend through the hollow beams and the joint bodies and adjacent the supports but between these and associated cover plates.

In order to afford the user comfortable access to the cable passages a vertical wall of each hollow beam can be constructed as a flap which is pivotable about a horizontal axis, whereby the vertical wall preferably forms the flap over nearly its entire height. The flap can be pivotable about a two-part joint of which the one joint part is integrally constructed with the flap and the other is integrally constructed with the main portion of the hollow beam.

Each joint body can have a substantially square cross-section, seen in a horizontal plane, whilst frame-like connecting plates serve to secure the joint bodies to the ends of the hollow beams and cover plates close the exposed sides of the joint bodies. The joint bodies can have corner surfaces inclined at 45° to their side walls, which corner surfaces serve to secure plates, namely extension plates for connecting to the hollow beams and cover plates. In this connection, lugs for mounting the cover plates can be arranged vertically offset so that two cover plates or extension plates placed above a corner close the corner surfaces.

In another embodiment the joint bodies may comprise separate components, namely a bottom plate, a top plate and side walls which are to be placed between them, namely closed side walls and/or open side walls through which cables may be passed.

Height adjustment devices, of which a portion engages in one of the openings of the table top, may be accommodated at the top of the joint bodies. The height adjustment devices can additionally offer the facility of inserting the upper frame through the openings in the table plate and securing it whereby the upper frame maintains its vertical position unaltered despite height adjustments of the table top.

Support arms of the upper frame can extend vertically and be straight or have the shape of one-fourth of a circular arc, that is to say extend upwardly and rearwardly from the openings within the table top. The upper frame can accommodate a multiplicity of additional components.

Examplary embodiments with further features of the invention will be described below with reference to the drawings.

BRIEF DESCRIPTION OF THE DRAWINGS

FIGS. 3 and 4 are exploded views of two modifications of an office workstation and components thereof.

FIG. 5 is a plan view of the left-hand side of a table plate with a triangular extension plate.

FIG. 6 is a perspective view of the left-hand side of an office workstation with an extension plate and extension cupboards.

FIG. 7 is a side view from the right-hand side of an office workstation.

FIG. 8 is a perspective view of a table plate with an upper frame and additional components.

FIG. 9 is a perspective view of a portion of a hollow beam of the upper frame with components to be attached.

FIG. 10 shows a hollow beam in cross-section.

FIG. 10a shows a detail of the hollow beam.

DETAILED DESCRIPTION OF THE DRAWINGS

Figure 1:
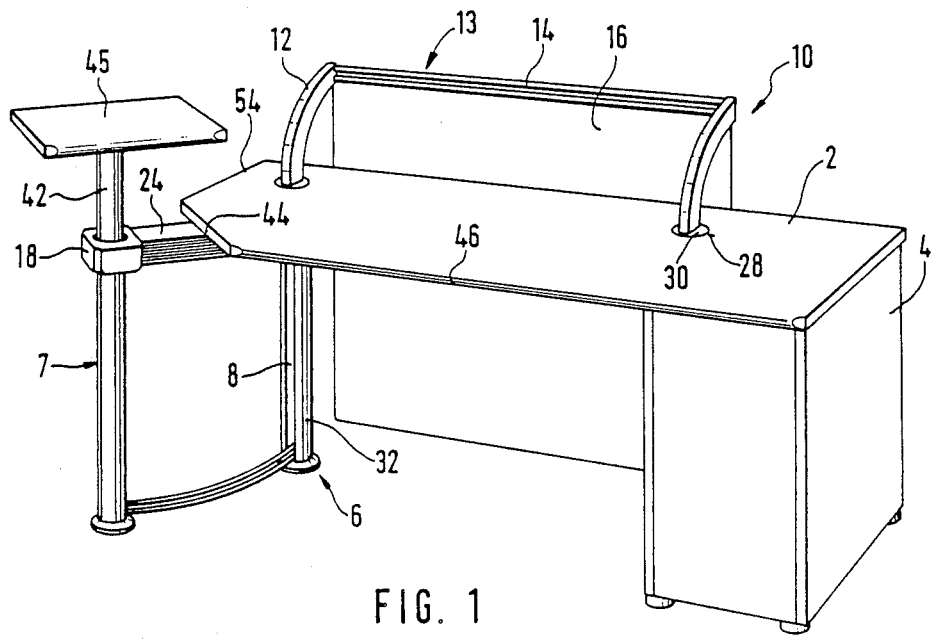
FIG. 1 is a perspective view of an office workstation in accordance with the invention.

FIG. 1 shows an office workstation with a table top or working surface 2, a lower cupboard 4, a lower frame 6 with legs 7 and an upper frame 10 with support arms 12 which are bent rearwardly. Mounted between the upper ends of two support arms 12 is a carrier 13 in the form of two parallel tubes 14 which can carry a wall 16 serving as a visual screen.

Figure 2:
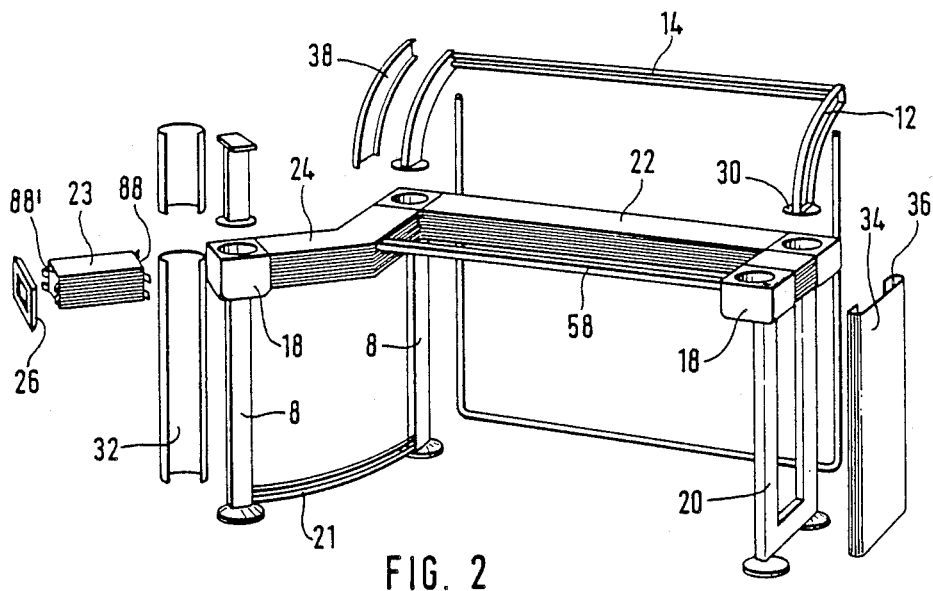
FIG. 2 is a perspective exploded view of the lower frame and upper frame and a few attachments of a similar office workstation.

As shown in detail in FIG. 2, joint bodies 18 produce the connections between simple supports 8 in the form of tubes of rectangular cross-section, which form the supporting portions of the legs 7 (or of U-shaped supports 20), straight hollow beams 22 and an angled hollow beam 24. The lower ends of the legs 7 are connected together by tubes 21. A short hollow beam 23, which is to be connected to a wall with the aid of a wall contact plate 26, may be attached to the outermost left-hand joint body in FIG. 2.

Figure 19:
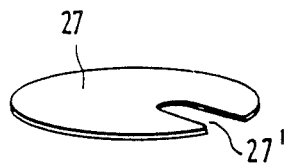
FIG. 19 shows a cover plate for one of the openings in the table plate.
Figure 20:
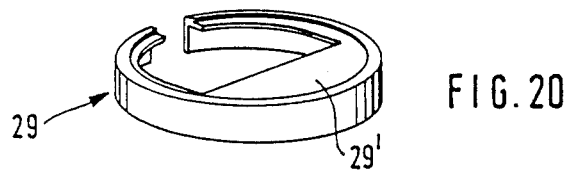
FIG. 20 shows an annular body for mounting the cover plate within the opening.

The joint bodies 18 have a substantially square, horizontal cross-section so that hollow beams 22,23,24 of the same cross-section may be attached from all four sides. At the top the joint bodies have a relatively large opening through which cables may pass and which serves to accommodate a height adjustment device for the table top 2. The table plate 2 has cylindrical openings 28 (FIG. 1), whose position corresponds to the openings of the two rear joints bodies 18 in FIG. 2. Cables may be passed through these openings 28 to devices, e.g. telephone, calculator (standing on the table plate). If no support arms 12 are used then the openings 28 are closed, with the exception of a cable opening 27', by cover plates 27 (FIG. 19). Each cover plate is rotatably mounted on a resilient annular body 29 (FIG. 20) which snaps over its outer edge. The annular body has a section 29' which in an appropriate rotary position closes the cable opening from below if no cables are to be passed through it. The annular body 29 is accommodated within the opening 28 above a height adjustment device (FIG. 11) which is yet to be described.

Figure 21:
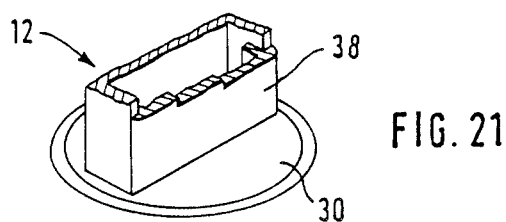
FIG. 21 shows a portion of the lower end of one of the support arms of the upper frame.

The support arms 12 are U-shaped in cross-section (FIGS. 1 and 21) and may be closed to form cable passages by curved cover plates 38. If the support arms 12 are used then cables can be guided through the openings 28 in the support arms and also onto the table plate.

The lower ends of the support arms 12 engage with lugs, which are not illustrated in FIG. 2, through the height adjustment devices into the joint bodies 18 and may thus be secured to the lower frame. The support arms and the components carried by them maintain their vertical position unaltered regardless of changes in the vertical position of the table plate 2. At their lower ends the support arms have cover discs 30 for closing the openings 28 in the table plate.

Horizontal cable passages are formed by the interior spaces in the hollow beams 22,23 and 24 and continue through the joint bodies 18. The supports 8 of the legs 7 have a rectangular, flat cross-section (see FIG. 11). Vertical cable passages are defined by virtue of the fact that the edges of two channel-shaped cover plates 32 are snapped over the vertical narrow sides of the supports 8 so that two empty spaces for receiving the cables are formed between the support and the cover plates.

The U-shaped support 20 may be closed by two cover plates 34 (of which only the right-hand one is illustrated), the main surfaces of which are flat and have the domed edge portions 36. The outer edge of the rear edge portion may be attached by means of a hinge to the narrow rear side of the support 20 and the outer edge of the front edge portion may be snapped onto the narrow front side of the support. A cable compartment is thus produced which can serve to receive multiple sockets, transformers and large amounts of residual cable (the portion which is not required of longer cables).

Joint bodies 18 serve not only as a connection between hollow beams and supports but can serve also to mount an upwardly extending leg 42 for a storage shelf 45 (FIG. 1). This leg can be formed in the same manner as the legs 7 but has a smaller height than them.

At the front left-hand side the table top 2 has an oblique edge 44. This oblique edge extends at an angle of 135° to the front edge 46 of the table top. Accordingly, the hollow beam 24 also describes an angle of 135°. Its free end in FIG. 1 thus projects at right-angles beneath the oblique edge 44. Alternatively or additionally an oblique edge, can be provided at the right-hand side of a table top which is then however shorter than that shown in FIG. 1. The oblique edge typically has a length of about 45 cm.

FIGS. 3 and 4 show further construction possibilities using a table top which has an oblique edge 44 at the left-hand side and an angled hollow beam 24. In FIGS. 3 and 4 two legs 7 are provided at the left-hand side which are connected together by a short, straight hollow beam 22. The left-hand front end of the hollow beam 24, two joint bodies 18 and the hollow beam 22 serve to support a substantially circular extension plate or working surface 50. In FIG. 4 a single leg 7 is provided only right at the exterior so that one of the joint bodies 18 is arranged in a self-supporting manner between hollow beams.

As shown in FIG. 5, one can produce a substantially rectangular table top extension by adding an approximately triangular extension plate 59 to the oblique edge 44.

FIG. 6 shows further attachment possibilities. Adjoining the oblique edge 44 is a substantially square extension plate 60. Inserted into the rear space between the back edge of the extension plate 60 and the left-hand side edge of the table top 2 is an extension plate 62 whose edges directed towards the user also define an angle of 135° whilst its rear edge is rounded. Below this extension plate 62 there is a lower cupboard 64 and above it an upper cupboard 66.

As shown in FIG. 7, a height adjustment device 68 is provided between a rear joint body 18 and the table top 2. The lower end of the support arm 12 engages through the table top with the height adjustment device. Simple height adjustment elements 72 are provided behind the rear edge 70 of the table top.

FIG. 8 shows in perspective a table plate 2 with a square extension top 60 and an upper frame 47. Firmly set in the two openings 28 in the table plate are two vertical support arms 48 which have a U-shaped cross-section and constitute cable passages. The open sides (of the U-shaped cross-sections) of the support arms are directed towards one another and each closed with a cover plate 49.

Mounted between the upper ends of the two support arms 48 is a carrier 13 in the form of a hollow beam 52 which is shown in FIG. 10 in cross-section and in FIG. 9 in perspective. The hollow beam has a forwardly open slot 53 through which cables may be introduced. The lower portion of the hollow beam serves as a cable passage 54. The hollow beam is extruded from aluminium or an aluminium alloy. At its top and its bottom it has a respective wall 55,56 in the form of a hollow semi-cylinder and a flat externally ribbed rear wall 57. The upper hollow space of the hollow beam 52 is blocked off by a horizontal plate 73. The plate is integrally constructed with an upwardly open tube 74 whose ends serve to receive self-tapping screws which serve to secure the hollow beam 52 between the support arms 48. The ends of the hollow beam 52 engage in the upper ends of the two support arms 48. Recesses, which are not shown, in the wall 56 at the ends of the hollow beam serve to carry cables from the support arms 48 into the hollow beam 52. By virtue of their U-shaped cross-section the support arms engage around the two ends of the hollow beam and thereby secure the hollow beam against rotation about a horizontal axis.

The hollow beam 52 serves to carry a multiplicity of different additional components of which only two differently shaped storage shelves 75,76 are shown here. As shown in FIG. 9, secured to the underside of the storage shelf 76 (or any other additional component) is a support 77 which has a semi-cylindrical recess 78 in its lower surface and thus rests on the upper wall 55 of the hollow beam 52. On each of its two lower edges this wall has an undercut 79. FIG. 10a shows on an enlarged scale the shape of such an undercut. Its upper surface has an angle, which is illustrated here as exaggeratedly large, of 10° with respect to a horizontal plane. The lower inner edges of the support 77 have jaws 82 shaped complementarily thereto which engage in the undercut 79 and thus maintain the support 77 in an unchanging orientation on the hollow beam. The support 77 is slid in the longitudinal direction onto the hollow beam. There is also provided a clip 80 in the form of a bent plate whose upper portion is flat and is secured at the rear side of the support 77 by screws whilst its lower portion is bent into semi-cylindrical shape and engages with jaws 82 into undercuts 81 which are provided at the front and the rear of the hollow beam above its lower wall 56.

To secure an additional component, such as the storage shelf 76, the support 77 is thus firstly slid in the longitudinal direction onto the hollow beam 52 whereby its lower jaws 82 snap behind the undercuts 79. The clip 80 is then so positioned from below that its front jaw 82 and a corresponding rear jaw engage in the two lower undercuts 81 in the hollow beam. The upper flat section of the clip 80 is subsequently firmly screwed to the rear side of the support 77.

Finally, a hollow cover 83 is slid from below over hollow beam 52, support 77 and clip 80 where it is inherently maintained in position by friction and stress.

Cables which are led up from below through the openings 28 in the table plate are placed in the interior space in the support arms 48 and then in the cable passage 54 in the hollow beam. They can be passed outwardly at any desired point in the hollow beam through the slit 53.

FIRST EMBODIMENT OF JOINT BODY AND HOLLOW BEAM

Figure 11:
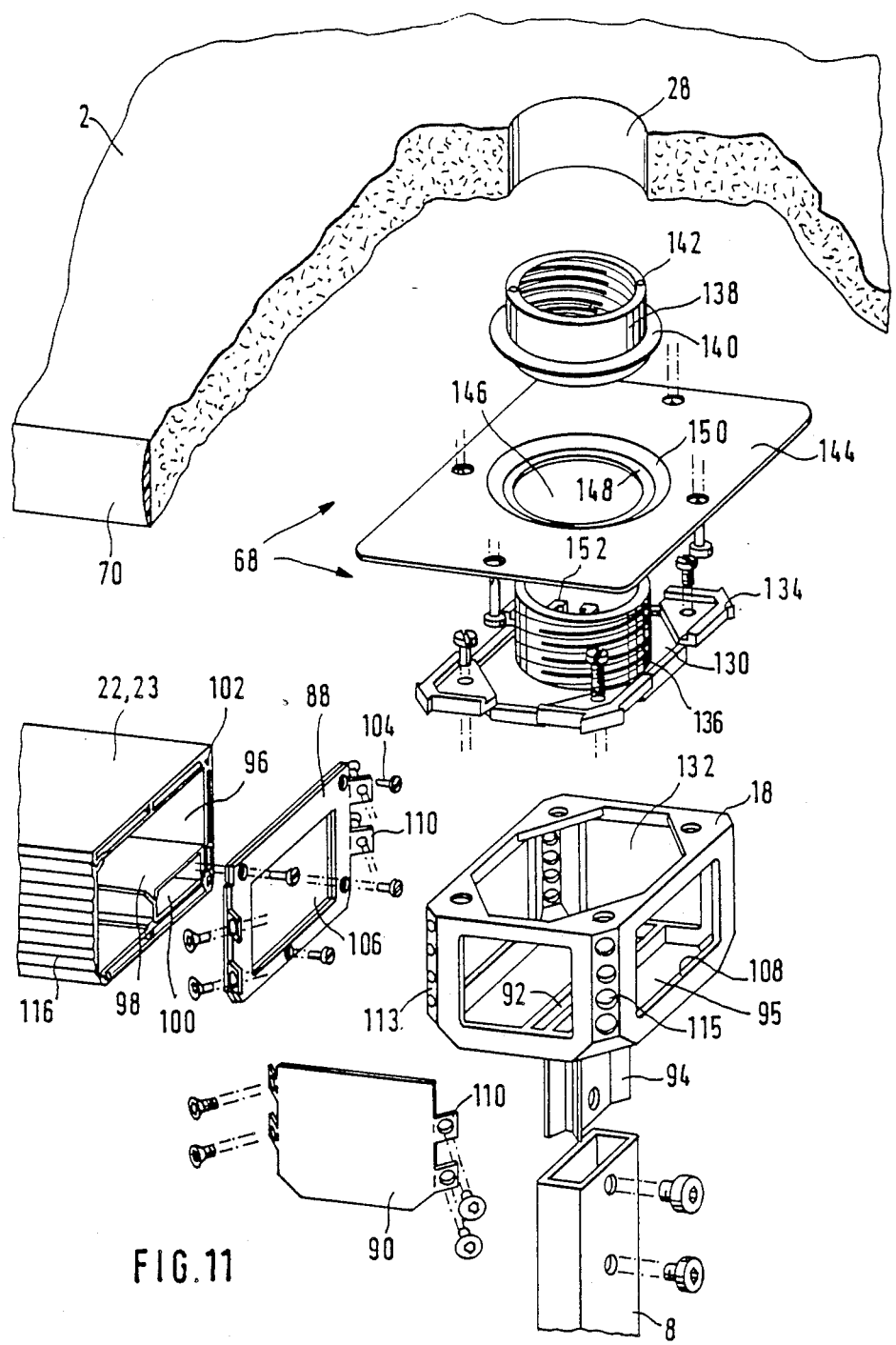
FIG. 11 is an exploded view of portions of a lower frame with a joint body and a hollow beam of a first embodiment and a height adjustment device and a portion of the table plate.

FIG. 11 is an exploded view of a portion of the table top 2 with its right cylindrical opening 28. Beneath it one can see the height adjustment device 68, beneath it a joint body 18 and beneath that the upper end of a support 8. On the left of the joint body may be seen the right-hand end of the hollow beam 22 and between them a connecting plate 88. The front opening in the joint body 18 may be closed by a cover plate 90. The joint body has at its lower end a transverse beam 92 to which a downwardly extending plug foot 94 is secured for insertion in the support 8. On both sides of the transverse beam there are openings 95 of sufficient size for passing through cables with their connector members.

The hollow beam 22 (FIG. 11) is manufactured of light metal in an injection moulding process and has at its top, rear and bottom double walls which ensure its stability with the use of as little material as possible. It forms a main cable passage 96 within which an inner cable passage 100 for telecommunications lines is divided off by an insert 98. In its corners the hollow beam 22 has holes 102 which serve for the securing of the connecting plate 88. The plate is screwed on with self-tapping screws 104.

Figure 12:
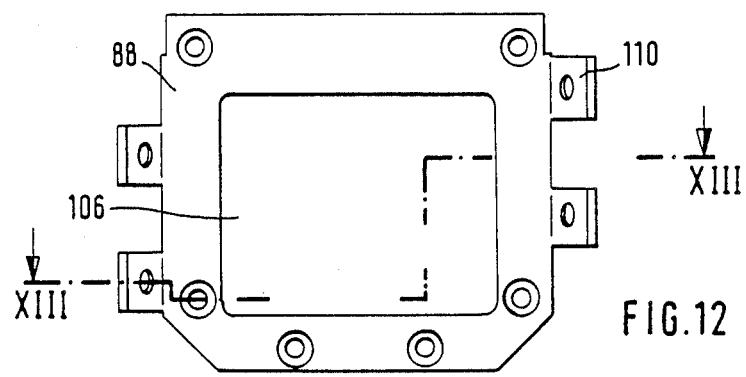
FIGS. 12 and 13 are two views of a connecting plate.
Figure 13:
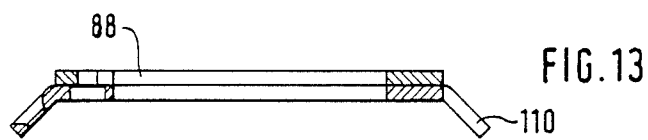

The connecting plate 88 (FIGS. 11,12 and 13) has a large opening 106 which has the same size as lateral openings 108 in the joint body 18. These openings are preferably so large that not only leads but also their plugs, and also if at all possible multiple sockets, can be passed through. The same applies for the height and breadth of the hollow beam 22 and its main cable passage 96. The connecting plate 88 has lugs 110 which extend away from its main plane at 135° and are so offset vertically that the space between two lugs is the same as the breadth of a lug plus clearance. As may be seen, the lugs on the right-hand side (FIG. 12) of the intermediate plate 88 are vertically offset with respect to those on the left-hand side. The same applies for the cover plate 90 (FIG. 11). If the intermediate plate 88 and the cover plate 90 are screwed on their lugs engage between one another and thus represent a row of lugs which is closed from the top to the bottom, which lugs completely cover from top to bottom one of four oblique corner surfaces 113 of the joint body.

Figure 18:
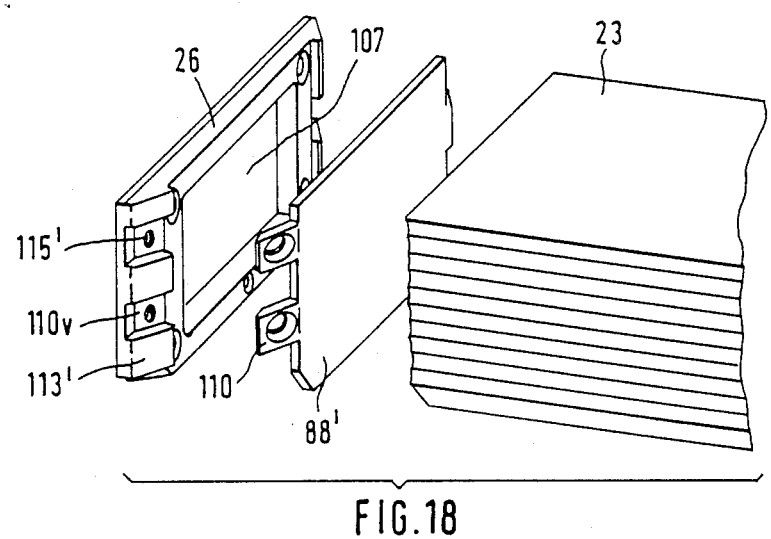
FIG. 18 is an exploded view of a wall contact plate, a connecting plate and an end of a hollow beam.

A wall contact plate 26 (FIG. 18) with a large opening 107 in its centre serves for fastening a hollow beam (e.g. 23 in FIG. 2) to a wall. On the right and left-hand sides the wall contact plate has a respective corner surface 113' which is inclined at 135° to its main plane and in which flat, rectangular recesses 110 v are provided for each lug 110 of a connecting plate 88'. Threaded bores 115', which extend at right-angles to the corner surfaces 113', are present for screwing on the lugs. After screwing on a hollow beam 22 or 23 provided with a connecting plate closed corner surfaces are produced at the wall contact plates 26.

Figure 16:
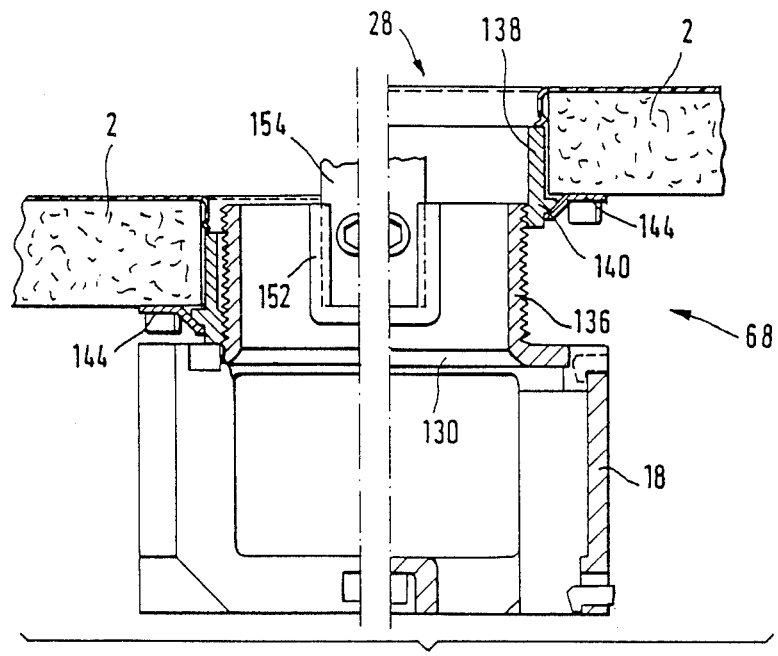
FIG. 16 is a vertical sectional view of a joint body of the first embodiment with a height adjustment device and the table plate in its lowest position on the left-hand side and its highest position on the right-hand side.
Figure 17:
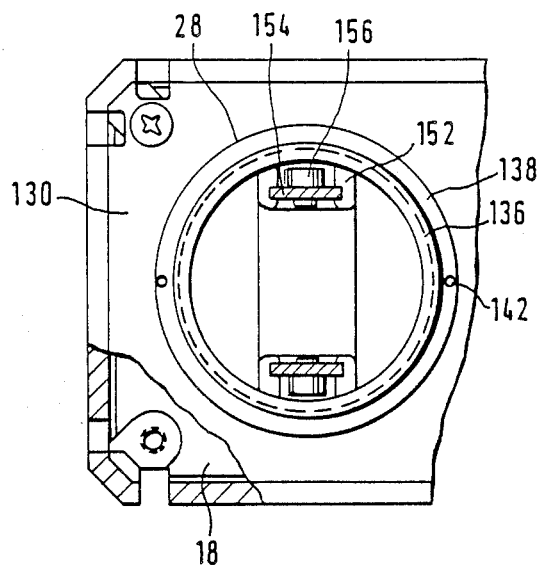
FIG. 17 is a plan view, partly in section, of this joint body with the height adjustment device.

The height adjustment device is shown in the upper half of FIG. 11 and in FIGS. 16 and 17. It has a lower fastening plate 130 which may be screwed to the top of the joint body 18 and then covers its upper opening 132. Its central portion extends into this opening whilst fastening lugs 134 at its four corners are connected to its central portion. The central portion carries an externally threaded sleeve 136. A sleeve with a complementary internal thread (internally threaded sleeve 138) is an independent component with a cylindrical external wall and an external flange 140 which is connected a little bit above its lower edge. The internally threaded sleeve 138 has two bores 142 which extend with their axes parallel and are accessible from above. They serve for the insertion of the two pegs of a front hole key by which the internally threaded sleeve can be rotated. An upper fastening plate 144 may be firmly screwed to the table top 2 from below. It has a central opening 146, which fits over the lower portion of the internally threaded sleeve 138, and a downwardly indented annular edge 148. The edge 148 merges into the fastening plate 144 via a bevelled section 150. The external flange 140 has a matching conical shape.

For the purpose of assembly an internally threaded sleeve 138 is inserted from below into each of the two openings 28 (FIGS. 11 and 3) in the table top. The upper fastening plate 144 is then screwed on at both points so that the internally threaded sleeve 138 is rotationally fixed in the opening 28. After the lower fastening plate 130 has been screwed to the joint body 18 the table top 2 is so placed above it and the further joint body that the internally threaded sleeves 138 can be screwed to the externally threaded sleeves 136. With the aid of the front hole key, which, is introduced through the openings 28 in the table top, each sleeve may be rotated with respect to the other whereby the table top 2 can be brought into an appropriate height. FIG. 16 shows the lower threshold position on the left-hand side and the upper threshold position on the right-hand side.

ATTACHMENT OF THE UPPER FRAME

Formed in the interior of the externally threaded sleeve 136 are vertical guides 152 (FIGS. 11,16,17) into which vertical band-shaped lugs 154 can be introduced from above. These lugs are mounted on the lower ends of the support arms 12 and permit the support arms to be anchored through the openings 28 in the table top 2 to the joint body 18. The lugs are each provided with a fastening screw 156 which can be drawn against the internal wall of the externally threaded sleeve 136 and thus secure the support arms against withdrawal.

SECOND EMBODIMENT OF THE HOLLOW BEAM

Figures 14, 15:
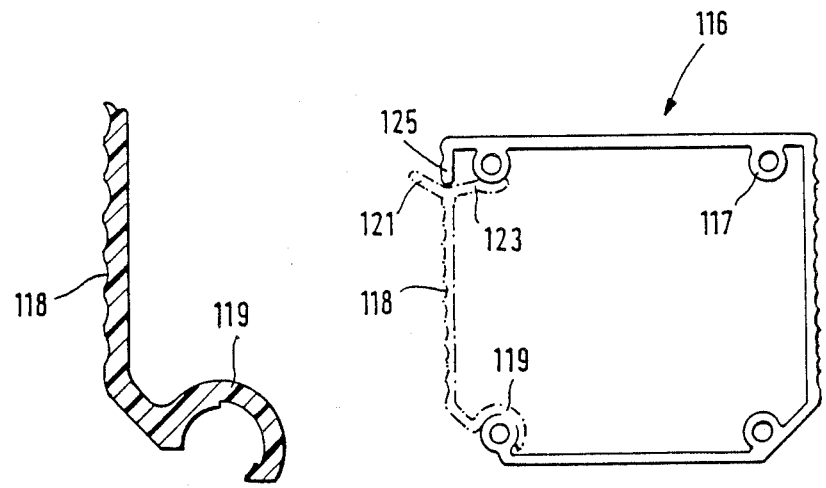
FIG. 14 is a side view of a hollow beam of a second embodiment.
FIG. 15 is a detail of the flap of the hollow beam in cross-section.

FIG. 14 shows a hollow beam 116, which is extruded from aluminium or light metal, with only simply constructed walls. Near its four corners there are small tubes 117 which are integrally constructed with the wall and whose free ends serve for screwing-in of self-tapping screws during the securing of the hollow beam. The one side of the hollow beam is open and may be closed by a flap 118, which is shown in chain-dotted lines in FIG. 14, of light metal or plastic. At the lower end of the flap there is provided a joint section 19 of approximately U-shaped cross-section. After the insertion of the flap this joint section engages around one of the little tubes 117. At its top the flap has an outwardly projecting gripping bar 121 and an inwardly projecting locking section 123 whose outer curved section serves to lock behind the upper left-hand little tube 117. The flap can thus be completely removed and then does not impede the insertion of the cable into the interior space in the hollow beam. The joint section 119 of the flap is then placed above the lower left-hand little tube 117 where it snaps into position since its joint section includes somewhat more than a semi-circle in cross-section. It is then swung upwardly and locked in position at the top. The inward movement is limited by abutment of its gripping bar against a downwardly directed section 125 of the hollow beam.

SECOND AND PREFERRED EMBODIMENT OF THE JOINT BODY

Figure 22:
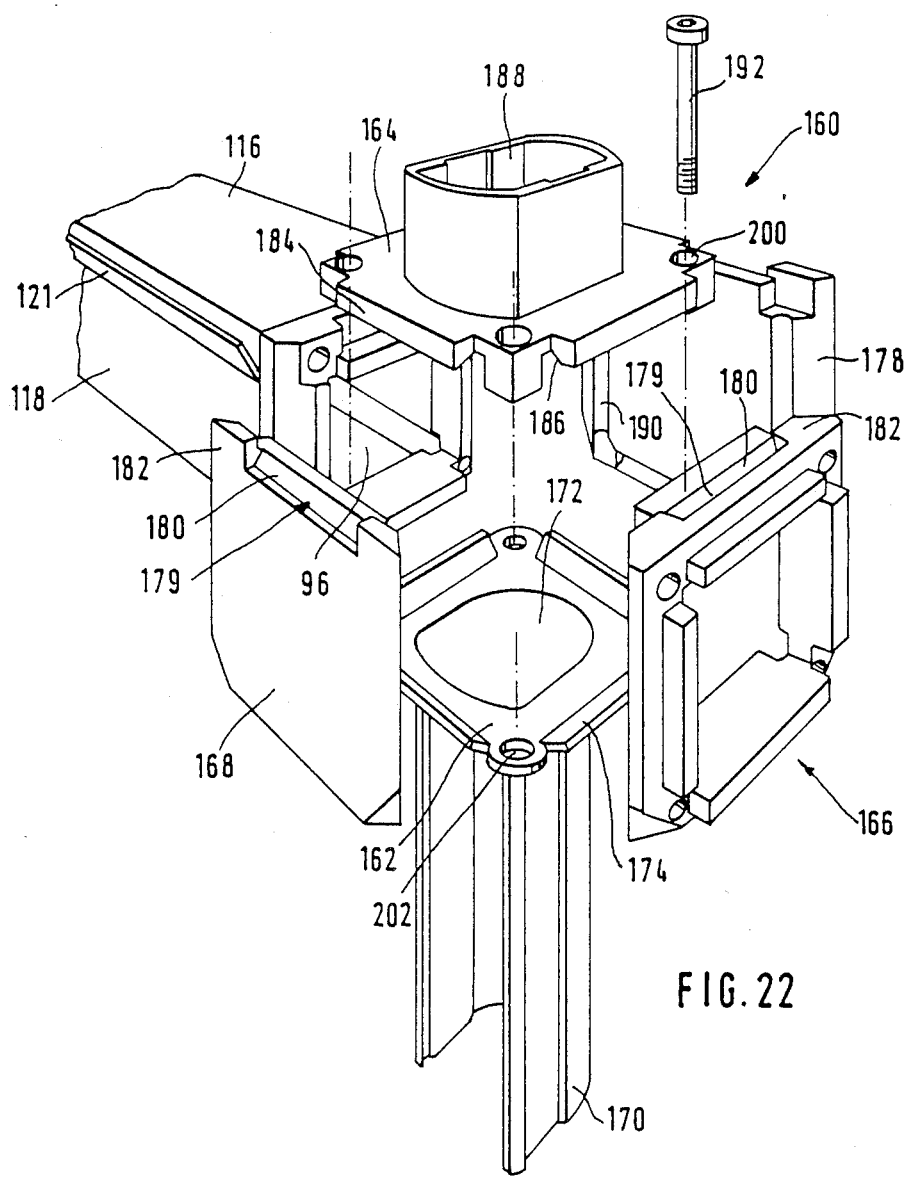
FIG. 22 is an exploded view of a second embodiment of support, joint body and hollow beam.

FIG. 22 shows a joint body which is designated as a whole with 160 and is to be assembled from individual components. The joint body is assembled when required from a bottom plate 162, a top plate 164 and four side walls, namely one to four open side walls 166 and/or one to four closed side walls 168.

Figure 24:
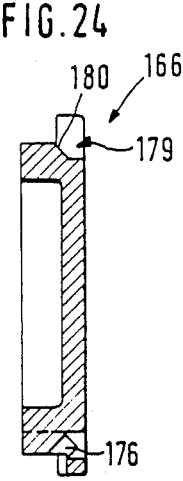
FIG. 24 is a cross-section on the line A—A in FIG. 23.
Figure 23:
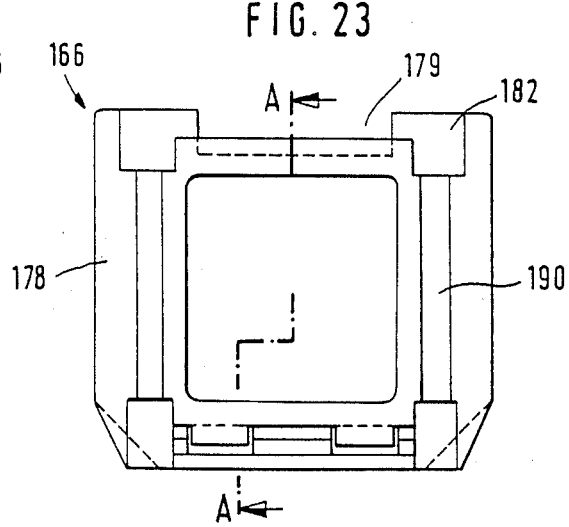
FIG. 23 is a plan view of a side wall of this joint body.
Figure 25:
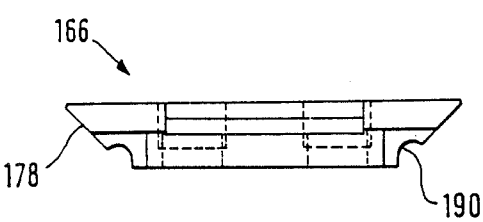
FIG. 25 is a view from above of the side wall.

The bottom plate 162 is fastened at the upper end of a support 170 of approximately U-shaped cross-section. It has a large central opening 172 through which cables can be passed upwardly from the interior space of the support. The four edge sections 174 of the base plate 162 are angled upwardly at 45°. All the side walls 166, 168 have at their bottom a continuous slot 176 (FIG. 24) which extends downwardly at 45° in such a manner that the side wall can be plugged onto the edge section 174 of the bottom plate. The left-hand and right-hand edge of each side plate extends at an angle of 45° to its main plane (FIG. 25). The four side walls can thus be mitred together. All the side walls have at their top a register surface 180 (FIGS. 22 and 24) which is also inclined at 45° and which is provided in a recess in the plate and is bordered laterally by upwardly projecting sections 182 of the side plates.

On its four sides the top plate 164 has engagement strips 184 which fit the recesses 179. On their interior they each have a pressure surface 186, inclined at 45°, which matches the register surface 180 on the side walls. The top plate has a large central opening and a fixture 188 with two wall sections parallel to one another and two circular cylindrically curved wall sections which serve to engage in the openings 28 in the table top.

The side walls 166 and 168 have continuous grooves 190 (FIG. 25) from top to bottom which provide space for the shafts of bolts 192.

To join this joint body together, four side walls 186, 188 are placed on the bottom plate 162 and these are either open or closed side walls depending on where cables must be laid. Then the top plate 164 is positioned, whereby its engagement strips 184 engage in the upper recesses 179 in the side walls and hold the side walls together. Finally, the bolts 192 are inserted from the four corners of the top plate through holes 200, in each case guided along into grooves 190 directed towards one another in the side walls and screwed into threaded holes 202 in the bottom plate.

The open side walls 166 are secured before the assembly of the joint body to a hollow beam 116 with the aid of self-tapping screws.

A height adjustment device, which acts between the fixture 188 and the table plate but is not shown here in detail, may be fitted in this second embodiment of the joint body also.

We claim:

1. An office workstation comprising:
   a lower frame including a plurality of vertically oriented legs;
   a plurality of hollow joint bodies supported on said legs at upper ends thereof;
   a plurality of hollow beams connected between said hollow joint bodies;
   a table top vertically adjustably supported by said lower frame, said table top having at least one corner having an edge extending obliquely to an adjacent edge, and wherein one of said plurality of hollow beams extends substantially perpendicularly away from and beyond said oblique edge;
   an upper frame supported by said lower frame and including a horizontal carrier mounted between a pair of substantially vertical supports extending through said table top; and
   wherein said legs, said joint bodies, said hollow beams and said upper frame include through openings for passage of cables.

2. The office workstation as claimed in claim 1, and wherein the oblique edge extends at an angle of about 135° to said adjacent edge of the table top.

3. The office workstation as claimed in claim 1 wherein said legs each include a tubular member and a cover plate of channel-like cross-section which at least partially surrounds said tubular member, in spaced relation thereto to thereby form a through opening for passage of the cables.

4. The office workstation as claimed in claim 1 wherein said one of the hollow beams supports a table top extension having an edge adapted for flush engagement with said oblique edge.

5. The office workstation as claimed in claim 4, wherein a hollow beam extension is attached to said one of said hollow beams and is adapted for connection to an adjacent wall.

6. The office workstation as claimed in claim 1 wherein each of said hollow beams has a vertical wall in the form of a flap which is pivotable about a horizontal axis and which extends over substantially the entire height of the wall.

7. The office workstation as claimed in claim 6, wherein said flap is pivotable about a two-part joint, one joint part constructed integrally with the flap, and the other joint part constructed integrally with another portion of the hollow beam.

8. The office workstation as claimed in claim 1 wherein each of said hollow joint bodies has a substantially square horizontal section, and wherein frame-like connecting plates serve to secure the joint bodies to ends of the hollow beams, and further wherein joint body cover plates close exposed sides of said joint bodies.

9. The office workstation as claimed in claim 8, wherein the through openings in said joint bodies have substantially identical size and shape of the through openings in the hollow beams.

10. The office workstation as claimed in claim 9 wherein said joint bodies each have side walls connected by corner surfaces inclined at substantially 45° to said side walls;
    said connecting plates each have vertical edges with lugs formed on said vertical edges inclined at 135° to a plane defined by each said plate so that said lugs may be jointed to said corner surface; and wherein
    lugs on any one vertical edge of a respective cover or connecting plate are vertically offset with respect to lugs on an adjacent vertical edge of an adjacent cover or connecting plate in such a manner that when the joint bodies are closed, the lugs of any two adjacent plates form a closed row from top to bottom at a corner surface.

11. The office workstation as claimed in claim 10 and wherein said lugs each have a hole for receiving a screw shaft and wherein the corner surfaces each have a vertical row of threaded bores vertically alignable with said holes in said lugs.

12. The office workstation comprising:
    a lower frame including a plurality of vertically oriented legs;
    a plurality of hollow joint bodies supported on said legs at upper ends thereof;
    a plurality of hollow beams connected between said hollow joint bodies;
    a table top vertically adjustably supported by said lower frame,
    wherein said joint bodies each comprise a bottom plate; a top plate vertically aligned with the bottom plate, and which carries a socket for mounting in an opening in the table top, and which has a central opening complementary thereto; four side walls which, in use, are vertically arranged between the bottom plate and top plate, wherein at least two of said side walls have cable passages formed therein.

13. The office workstation as claimed in claim 12 wherein said side walls are formed with vertical edges inclined inwardly at 45°, and wherein said edges are also provided with vertical grooves for embracing shafts of bolts by which the top plate is connected with the bottom plate, after the insertion of side walls therebetween.

14. The office workstation as claimed in claim 13 wherein said side walls are each provided with a slot along a bottom edge which extends downwardly and inwardly when the joint body is assembled, and wherein the bottom plate has edge sections extending upwardly and outwardly when the joint body is assembled, each said slot adapted to receive a corresponding edge section.

15. The office workstation as claimed in claim 12 wherein edges of the top plate have downwardly directed engagement bars formed thereon, and upper edges of the side walls have recesses for receiving said engagement bars.

16. The office workstation as claimed in claim 15, wherein the jaws and the recesses have complementary inclined surfaces which are engaged when the joint body is assembled.

17. The office workstation as claimed in claim 8, wherein said connecting plates are provided with a plurality of holes for receiving screw shafts, and wherein end faces of the walls of the hollow beams have complementarily arranged holes.

18. The office workstation as claimed in claim 1 and further comprising a wall contact plate with a plurality of screw openings for fastening at least one of said hollow beams to a wall wherein said wall contact plate has side edge surfaces inclined at 135° to a plane defined by said wall contact plate, and wherein said inclined side edges are provided with a plurality of holes within associated recessed areas for receiving correspondingly shaped lugs of a connecting plate adapted to be inserted between said wall contact plate and said hollow beam.

19. The office workstation as claimed in claim 1 wherein a plurality of height adjustment devices are mounted in part on an upper side of a respective joint body and in part on an underside of said table top for securing the lower frame to the table top.

20. The office workstation comprising:
   a lower frame including a plurality of vertically oriented legs;
   a plurality of hollow joint bodies supported on said legs at upper ends thereof;
   a plurality of hollow beams connected between said hollow joint bodies;
   a table top vertically adjustably supported by said lower frame, wherein a plurality of height adjustment devices are mounted in part on an upper side of a respective joint body and in part on an underside of said table top for securing the lower frame to the table top.

21. The office workstation as claimed in claim 20 wherein each said height adjustment device comprises:
   a lower fastening plate to be secured to an associated joint body and an upper fastening plate to be secured to an undersurface of the table top,
   a first upwardly extending sleeve with an external thread mounted on the lower fastening plate,
   a second sleeve with a complimentary internal thread for threaded engagement with the first sleeve, said second sleeve adapted to extend through an opening in the table top;
   and wherein said second sleeve is provided with an external flange, and said upper fastening plate has a circular opening formed therein which fits with a clearance over said first sleeve and whose diameter is smaller than that of the external flange of said second sleeve; and further wherein
   after assembly of the upper and lower fastening plates, vertical spacing between the upper fastening plate and the lower fastening plate, and thus the height of the table top, may be altered by rotating said first sleeve with respect to said second sleeve.

22. The office workstation as claimed in claim 21, wherein vertical guides are provided in the interior of said first sleeve for receiving lugs which extend upwardly from support arms of an upper frame, and which serve to facilitate fastening of said upper frame to the lower frame, and wherein the lugs may be slid into said guides from above and may be fixed in position by screws.

23. The office workstation as claimed in claim 21 wherein said upper frame includes two support arms whose lower ends are to be connected to the lower frame through openings in the table top, and wherein a carrier member is secured to the upper ends of the support arms, said carrier member extending parallel to the table top.

24. The office workstation as claimed in claim 23 wherein the support arms describe a quarter circular arc.

25. The office workstation as claimed in claim 24, wherein a visual screen which extends downwardly from said carrier member.

26. The office workstation as claimed in claim 22 wherein the carrier member comprises a hollow beam of elongate upright cross-section, having a longitudinal slit on one side thereof of a width sufficient for passing cables through it, the carrier defining a cable passage in its interior below the height of the longitudinal slit.

27. The office workstation as claimed in claim 26 wherein said carrier member includes partially cylindrical external upper and lower wall surfaces, and wherein undercuts extend over substantially the length of the carrier member adjacent said external surfaces, and further wherein support members for mounting additional components to said carrier member are provided, said support members provided with jaws complementary to said undercuts.

28. The office workstation as claimed in claim 1 wherein the lower frame includes an upwardly open U-shaped member on at least one side, and a cover plate shaped member with trough-like edge portions joined to both sides of the support in such a manner that space between the cover plates represents a cable compartment whose breadth between the cover plates is substantially larger than the breadth of the support.

* * * * *